(12) United States Patent
Chen et al.

(10) Patent No.: US 11,929,019 B2
(45) Date of Patent: Mar. 12, 2024

(54) METHOD FOR PROCESSING STATIC PATTERN IN AN IMAGE AND CIRCUIT SYSTEM

(71) Applicant: REALTEK SEMICONDUCTOR CORP., Hsinchu (TW)

(72) Inventors: Cheng-Yueh Chen, Hsinchu (TW); Ju-Wen Tseng, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 114 days.

(21) Appl. No.: 17/348,903

(22) Filed: Jun. 16, 2021

(65) Prior Publication Data

US 2021/0400229 A1    Dec. 23, 2021

(30) Foreign Application Priority Data

Jun. 17, 2020 (TW) ................................. 109120344

(51) Int. Cl.
*H04N 5/57* (2006.01)
*G06V 20/40* (2022.01)
*G09G 3/3208* (2016.01)

(52) U.S. Cl.
CPC .......... *G09G 3/3208* (2013.01); *G06V 20/40* (2022.01); *G09G 2320/046* (2013.01); *G09G 2320/103* (2013.01); *G09G 2340/16* (2013.01)

(58) Field of Classification Search
CPC ........... G09G 3/3208; G09G 2320/046; G09G 2320/103; G09G 2340/16; G06V 20/40; H04N 5/57
See application file for complete search history.

(56) References Cited

U.S. PATENT DOCUMENTS

| 8,301,577 | B2 * | 10/2012 | Sheu | G06V 20/52 |
| | | | | 706/46 |
| 8,456,492 | B2 | 6/2013 | Shidara et al. | |
| 10,623,683 | B1 * | 4/2020 | Marchya | H04N 21/4318 |
| 2006/0001601 | A1 * | 1/2006 | Ono | G09G 3/007 |
| | | | | 345/60 |
| 2006/0007080 | A1 * | 1/2006 | Yeh | G09G 3/36 |
| | | | | 345/87 |
| 2007/0146485 | A1 * | 6/2007 | Horikoshi | G09G 3/007 |
| | | | | 348/173 |

(Continued)

FOREIGN PATENT DOCUMENTS

CN    101308625 B    3/2011

*Primary Examiner* — Antonio Xavier
(74) *Attorney, Agent, or Firm* — Li & Cai Intellectual Property (USA) Office

(57) ABSTRACT

A method for processing a static pattern in an image and a circuit system are provided. In the method, each of frames of a video is divided into multiple areas. Several algorithms are used to calculate a static pattern index of every area. The static pattern index is used as a reference for determining if the area covers part or entire of a static pattern. An index threshold can be used to check the areas that are determined as the static pattern initially. A time threshold is then used to confirm the areas with the static pattern in every frame. Image data of the areas which are determined as the static patterns can then be adjusted, such as having brightness of the area that is determined as part or entire of the static patterns decreased, for preventing the display panel from negative effects of the static pattern.

18 Claims, 8 Drawing Sheets

(56) References Cited

U.S. PATENT DOCUMENTS

| | | | | |
|---|---|---|---|---|
| 2009/0179909 A1* | 7/2009 | Fernandez | ............... | G09G 5/00 |
| | | | | 345/581 |
| 2009/0184952 A1* | 7/2009 | Yoshihama | .......... | G09G 3/2927 |
| | | | | 345/212 |
| 2013/0155090 A1* | 6/2013 | Pourbigharaz | ........ | G06F 1/3265 |
| | | | | 345/589 |
| 2014/0049566 A1* | 2/2014 | Sudou | ..................... | G09G 3/007 |
| | | | | 345/681 |
| 2016/0320834 A1* | 11/2016 | Lee | ......................... | G06F 3/017 |
| 2017/0162127 A1* | 6/2017 | Park | ..................... | G09G 3/3233 |
| 2018/0061325 A1* | 3/2018 | Luo | ..................... | G09G 3/3258 |
| 2019/0258114 A1* | 8/2019 | Kwon | .................... | H05B 45/12 |
| 2020/0007817 A1* | 1/2020 | Diggins | ................. | G06V 10/98 |

* cited by examiner

```
obtaining static pattern index of each of the areas     ~S901
of a plurality of frames for a period of time comparing with an index threshold                       ~S903 compensating the static pattern index of
the area if the static pattern index is                 ~S905
larger than or equal to an index threshold
```

METHOD FOR PROCESSING STATIC PATTERN IN AN IMAGE AND CIRCUIT SYSTEM

CROSS-REFERENCE TO RELATED PATENT APPLICATION

This application claims the benefit of priority to Taiwan Patent Application No. 109120344, filed on Jun. 17, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The disclosure is related to an image processing method, and more particularly to a method for adjusting brightness of an area having a static pattern and a circuit system.

BACKGROUND OF THE DISCLOSURE

A static pattern of a video refers to an advertisement, a logo or any fixed image appearing at a fixed location of a picture broadcasted from a TV station. This kind of static pattern may have an impact on a display panel under certain circumstances; for example, burn marks may occur on an OLED (organic light-emitting diode) display.

Therefore, in one of the conventional technologies, a program periodically makes a change (e.g., a slight positional change of an entire frame) to an image displayed on a display of an electronic device that may have the burn marks due to the static pattern. In another scheme, the image displayed on the display can be divided into multiple regions, and the brightness of each of the regions is adjusted for preventing problems caused by the static pattern being displayed at a fixed location of the display.

SUMMARY OF THE DISCLOSURE

For preventing an impact on a display panel because of a static pattern, the static pattern in a video should be firstly determined and then a method is introduced for processing the static pattern. Provided in the disclosure is a method for processing the static pattern in an image and a circuit system thereof. In the method, every frame in a video is divided into multiple areas. Several algorithms are provided in the disclosure to calculate a static pattern index for each of the areas of the frames. The static pattern index serves as a reference for indicating part or entire of the static pattern covered by each of the areas. The pixel or area having the static pattern in every frame can be initially filtered by an index threshold. A time threshold is then used to confirm the pixel or the area that has the static pattern. The image data of the area to be determined having the static pattern is adjusted. For example, a brightness value of the static pattern can be reduced for preventing negative effect on the display panel due to the static pattern.

According to one embodiment of the circuit system, the circuit system includes an image processing circuit that performs the method for processing the static pattern in an image. When the static pattern is detected in consecutive frames, the method for processing the static pattern is performed. When obtaining the static pattern of the consecutive frames, the image data of the frames should be adjusted so as to prevent the negative effects caused by the static pattern. After that, the adjusted image data is outputted to a display control circuit so as to output the data to a driving circuit of a display. Then, the display displays the image.

Preferably, the time threshold can be flexibly adjusted according to a frame rate of a display panel that uses the circuit system. The time threshold indicates a number of consecutive frames of the video.

Further, in the method for processing the static pattern in the image, several methods for determining the static pattern are used to calculate the static pattern index of the pixel or area. The methods are, for example, a brightness clustering method, a brightness difference method between preceding and following frames, a high-frequency difference method between preceding and following frames, and a hole-filling method. When any of the methods for determining the static pattern confirms the static pattern, the score of the static pattern index is accumulated.

Next, characteristics of the pixels or areas close to the pixel or area, or characteristics of the preceding and following frames of the pixel or area are used to correct a misjudgment result about the static pattern. The methods can be a compensation method for timeline information and a spatial information compensation method. When misjudging the static pattern, the score of static pattern index is decreased; when misjudging the non-static pattern, the score is increased.

Still further, when the pixel or the area is determined as the non-static pattern, the score of the static pattern index of the pixel or the area is reset to zero or an original value. However, the mentioned brightness difference method between preceding and following frames, high-frequency difference method between preceding and following frames, the brightness relationship between the neighboring pixels or areas, and a method for detecting whether or not a specific object exists in the image can be used to prevent a mistake when resetting the score.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
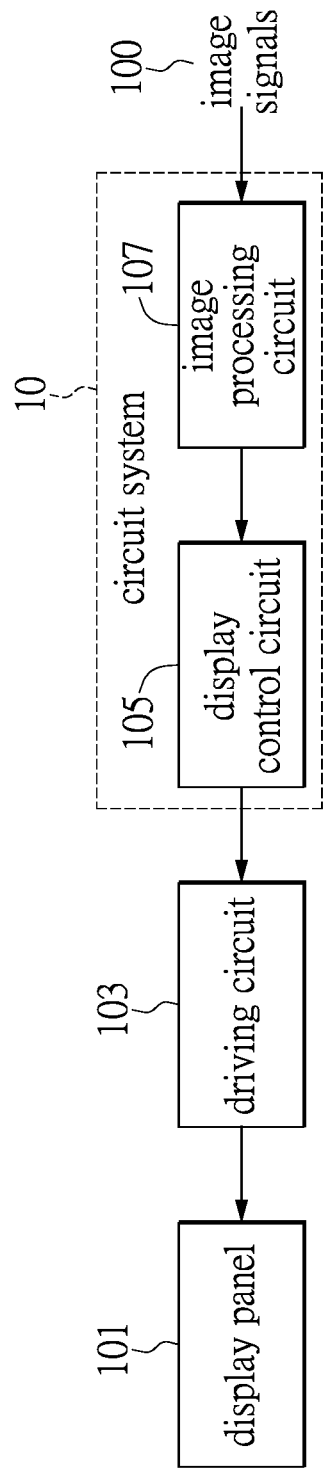
FIG. 1 is a circuit block diagram of a circuit system for controlling a display panel and a driving circuit in one embodiment of the disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In response to problems that a static pattern in an image may cause to a display panel, provided in the disclosure is a method for adjusting brightness of areas having the static pattern in the image and a circuit system thereof. The problems caused to the display panel include, for example, a burn mark occurring on an OLED display, a permanent damage occurring on a display with a specific display technology, e.g., CRT, or an imprint occurring on a poor quality LCD display due to a high-contrast static pattern. One of the objectives of the method is to obtain the static pattern in a video/an image. Reference is made to FIG. 1, which is a circuit block diagram depicting the circuit system that implements the method for processing static pattern in the video/the image according to one embodiment of the disclosure.

FIG. 1 shows a circuit system 10 including a display panel 101 and a driving circuit 103. The circuit system 10 receives image signals 100 from a source. After processing the image signals 100, an image data is outputted to the driving circuit 103 and then displayed on a display panel 101. Main components of the circuit system 10 include a display control circuit 105 and an image processing circuit 107.

After receiving the image signals 100, the image processing circuit 107 of the circuit system 10 processes an image according to a format configured to playback the video and a resolution of the display. Signals, such as a kind of low-voltage differential signals, which are to be provided to the display control circuit 105 are generated. The display control circuit 105 then controls a clock for serially outputting the image signals to the driving circuit 103 of the display. The display panel 101 of the display is used to playback the video. The method for processing the static pattern in an image can be operated in the circuit system 10. The method can also be embodied as functions performed in a firmware program of the image processing circuit 107.

One of the objectives of the method operated in the circuit system 10 is to detect the static pattern in a video when receiving the image signals 100. The static pattern is, for example, an image that remains still for a while. The image data of the static pattern can be adjusted. The image data to be adjusted is, for example, a brightness value. The adjusted image data makes the static pattern that is displayed for a long time not to adversely affect the display panel.

Figure 2:
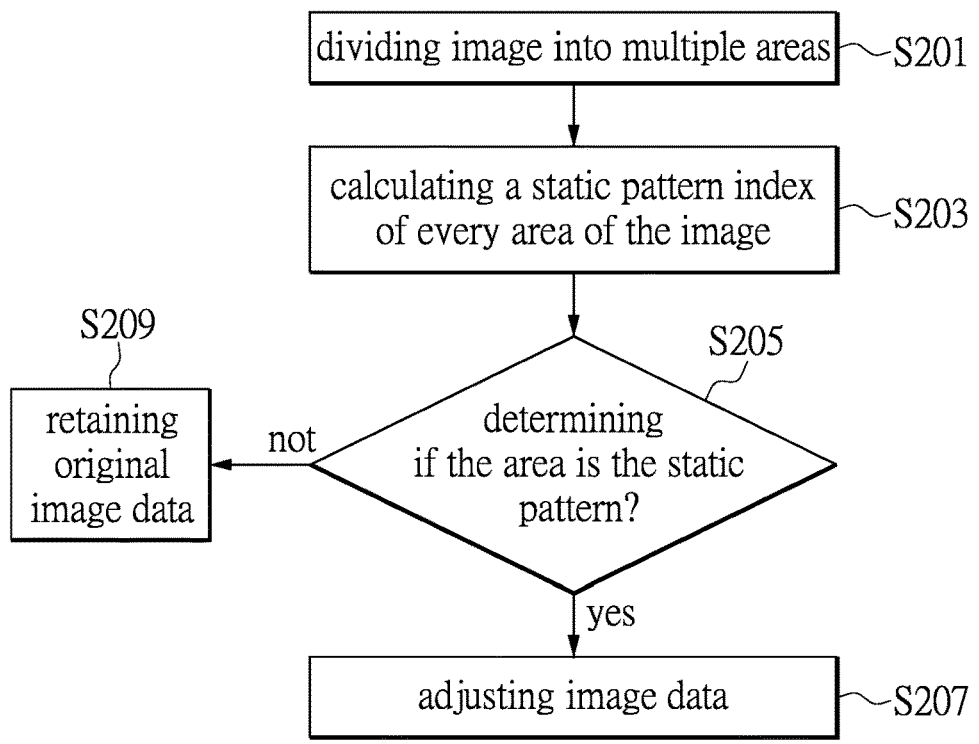
FIG. 2 is a flow chart describing a method for processing a static pattern in an image in one embodiment of the disclosure.

The method for processing static pattern in an image in one embodiment of the disclosure can be referred to FIG. 2, in which a flow chart describing the main concept of the method is shown.

The method can be performed in an image processing circuit. After receiving a video from an image source, a static pattern index with respect to every frame of the video is calculated. More specifically, the static pattern index for each of the pixels or areas of the video can be calculated. The static pattern index indicates a score of every pixel or every area of every frame that is determined as the static pattern. The more efficient way is to divide the image into multiple areas (step S201), and to calculate a static pattern index for each of the areas (step S203). The static pattern index of each of the areas is used to determine whether or not the static pattern exists, and the method can efficiently eliminate a misjudgment. According to one embodiment, several methods are used to determine whether or not the area includes part or entire of the static pattern. If the pixel or the area is determined as the static pattern, the score of the static pattern index is increased.

When the static pattern indexes with respect to multiple areas of every frame are obtained, the method determines whether or not the area is the static pattern according to the static pattern index of the area (step S205). For example, an index threshold is introduced. The index threshold allows the system to determine whether or not the pixel or the area may be a part of the static pattern in the video. Therefore, the pixel or the area with the static pattern index greater than the index threshold can be initially filtered out. A time threshold is also introduced. The time threshold is referred to as a threshold of number of consecutive frames according to a frame rate of the video. The time threshold is used to confirm the pixel or the area is the static pattern. Therefore, if the video includes the pixel(s) or the area(s) with the static pattern indexes greater than the index threshold and also reaches the time threshold, the pixel or the area is determined as the static pattern. Therefore, the image data of the pixels or the areas are adjusted (step S207). The adjusted image data is then outputted. Otherwise, if the static pattern index of the pixel or the area is not greater than the index threshold, or does not reach the time threshold even if the static pattern index is greater than the index threshold, the pixel or the area is not determined as the static pattern. The pixel or the area retains its original image data if the pixel or the area is determined to be not a static pattern (step S209).

It should be noted that the image data is, for example, a brightness value. In the step S207, when one or more areas are determined as part or entire of the static pattern, the brightness value with respect to the areas can be adjusted. Therefore, the static pattern in the consecutive frames of the video can be obtained and properly adjusted before the video is outputted or displayed. The method can effectively prevent the static image in the video from negatively affecting the display panel.

According to one of the embodiments of the method for adjusting the brightness value of the area, a non-static-pattern brightness curve and a static pattern brightness curve with respect to the current frame are introduced. Based on the brightness value and the static pattern index with respect to each of the pixels or the areas obtained by the above-mentioned methods, the non-static-pattern brightness curve and the static pattern brightness curve are referred to, so as to calculate a weight for adjusting brightness value of the pixel or the area based on the static pattern index of the current area or the pixel. According to the curves, the weight for adjusting brightness value is higher if the static pattern index is higher, and the weight is lower if the static pattern index is lower. The system adjusts the brightness values of the areas or the pixels in the video according to their corresponding weights but not uniformly lowers the brightness value of the entire static pattern.

The method for processing static pattern is performed on each of the consecutive frames. In the circuit system, the brightness values of the areas that are determined as the static pattern in the consecutive frames are adjusted. An adjustment of the brightness of the static pattern can effectively prevent the burn marks from occurring on the display panel. It should be noted the static pattern can be defined by the system according to characteristics of the display panel. The system also sets up the time threshold based on the characteristics of the display panel. The time threshold is flexibly adjusted according to characteristics of the display panel that uses the circuit system. For example, the display panel and its control circuit provide a capability of displaying with a specific frame rate. The time threshold used to determine the static pattern in the image indicates a number of the consecutive frames.

Figure 3:
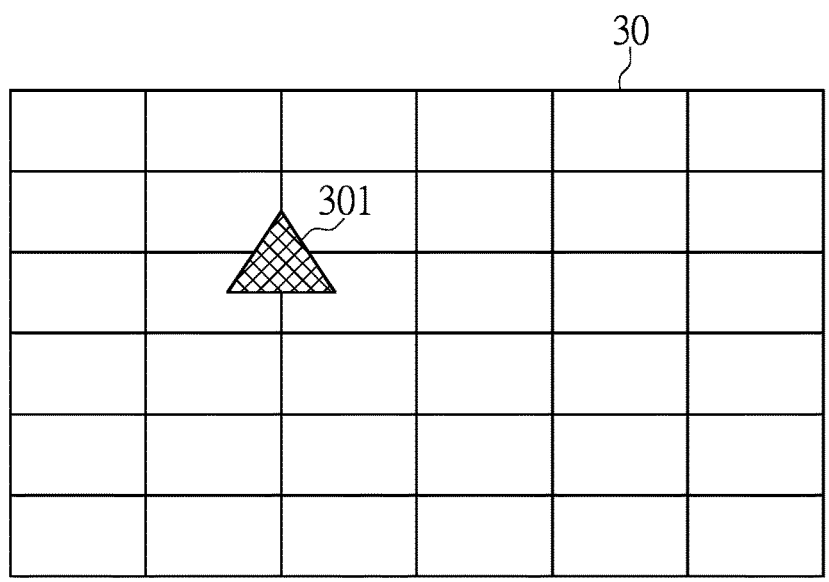
FIG. 3 is a schematic diagram depicting an image that is divided into multiple areas in one embodiment of the disclosure.

The process described in the step S201 of the above embodiment can be an efficient method since it divides the image into multiple areas. Reference is made to FIG. 3, which is a schematic diagram depicting that an image is divided into multiple areas. When receiving a video file, the image data including a plurality of frames that is processed by a firmware process in an image processing circuit. The frame is divided into multiple areas, e.g., the 'm×n' areas divided from the image frame 30 as exemplarily shown in FIG. 3, and each area has 'p×q' pixels. In the exemplary example, a static pattern 301 appears over consecutive frames, and the static pattern 301 may cover multiple areas in each frame.

Figure 4:
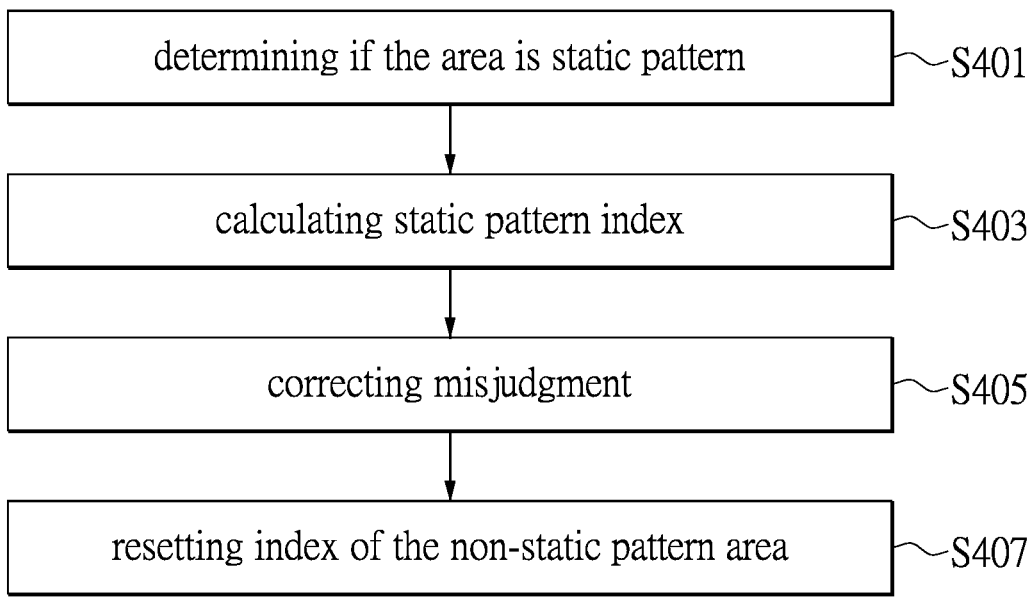
FIG. 4 is a flow chart describing calculation of a static pattern index in one embodiment of the disclosure.

In the method for processing the static pattern in an image, several methods for determining the static pattern are used to calculate the static pattern index of each of the pixels or areas. The method for determining the misjudgment is also included. Reference is made to FIG. 4, which shows a flow chart describing the calculation of the static pattern index according to one embodiment of the disclosure.

In step S401, for the areas divided from every frame, the methods for determining static pattern are used to determine whether or not each of the areas in the frame includes part or entire of the static pattern. The methods are, for example, a brightness clustering method described in the flow chart shown in FIG. 5, a brightness difference method between preceding and following frames described in the flow chart shown in FIG. 6, a high-frequency difference method between preceding and following frames described in FIG. 7 and a hole-filling method described in FIG. 8. The methods for calculating static pattern index for the areas are also adapted to calculating the static pattern index for pixels.

A static pattern index can be calculated for each of the areas in the frame. In step S403, the score of the static patter index of the area is increased, e.g., adds one or some points, if the area is determined as the static pattern. When several methods are used to determine the static pattern in each of the areas, the score of the static pattern index of the area can be accumulated if any method determines that the area includes a static pattern. A final score is used as a reference to confirm the static pattern.

However, it is possible to misjudge the static pattern. For example, the image may be interfered by noises and result in misjudging the area to be with or without the static pattern. Therefore, in step S405, characteristics of the area or pixel in the preceding frame and the following frame, or the neighboring areas or pixels of the current area or pixel are referred to for correcting a misjudgment of the static pattern. For example, when an area is a static pattern, and such a static pattern should be retained in the video for a period of time, whether the image data, e.g., the brightness or frequency, of the area having the static pattern in the preceding frame and the following frame is consistent or within a range of error can be referred to for eliminating the misjudgment. The range of error can be used as a reference for filtering out the areas that are misjudged as the static pattern or finding the areas that are misjudged as the non-static pattern. The static pattern index with respect to the area can be corrected. For example, the score of the static pattern index is decreased if the area is misjudged as the static pattern, and the score is increased if the area is misjudged as the non-static pattern. The methods for compensating the static pattern index can be referred to FIG. 9 and FIG. 10, which show a flow chart describing the compensation method for timeline information, and the spatial information compensation method, respectively.

Figure 11:
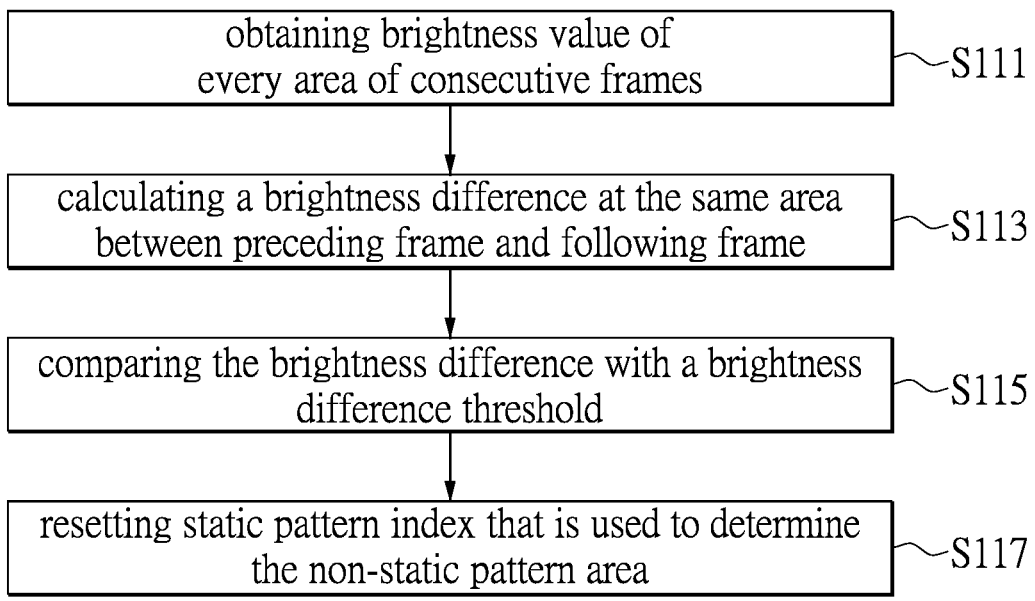
FIG. 11 is a flow chart describing a process of resetting the static pattern index via a brightness difference method between preceding and following frames in one embodiment of the disclosure.

In step S407, when calculating the static pattern index for each of the areas, the area is determined as the static pattern if the static pattern index reaches a threshold. Otherwise, if the static pattern index does not reach the threshold, the area is determined as the non-static pattern, or as merely having some smaller patterns that are not regarded as the static pattern since they will not affect the display panel. The static pattern index of the area is reset to zero or an original value since the area is determined as the non-static pattern. The methods for determining whether or not the static pattern index should be reset to zero can be referred to FIG. 11 that shows the brightness difference method between preceding and following frames, FIG. 12 that shows the high-frequency difference method between preceding and following frames, FIG. 13 that shows the method for preventing misjudgment via spatial information, and FIG. 14 that shows the method for preventing misjudgment by detecting a specific object.

Finally, an accumulated score of the static pattern index of the area is used to determine whether or not the area is a static pattern. Further, the image data of the area is then adjusted for eliminating the impact on the display panel.

The followings are the methods for calculating static pattern index.

Embodiment 1: Brightness Clustering Method

Figure 5:
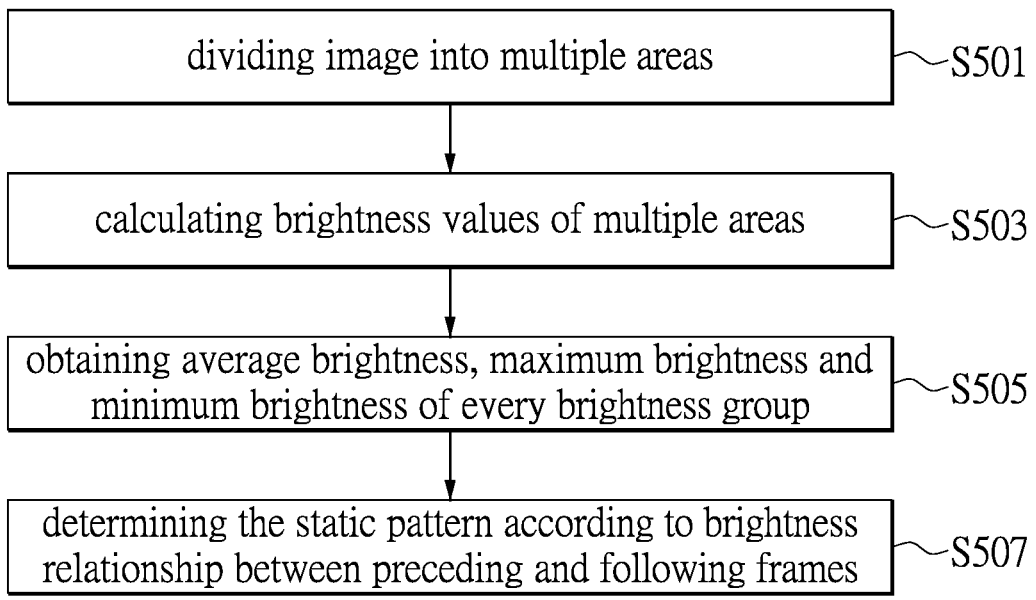
FIG. 5 is a flow chart describing a process for determining a static pattern via a brightness clustering method in one embodiment of the disclosure.
Figure 6:
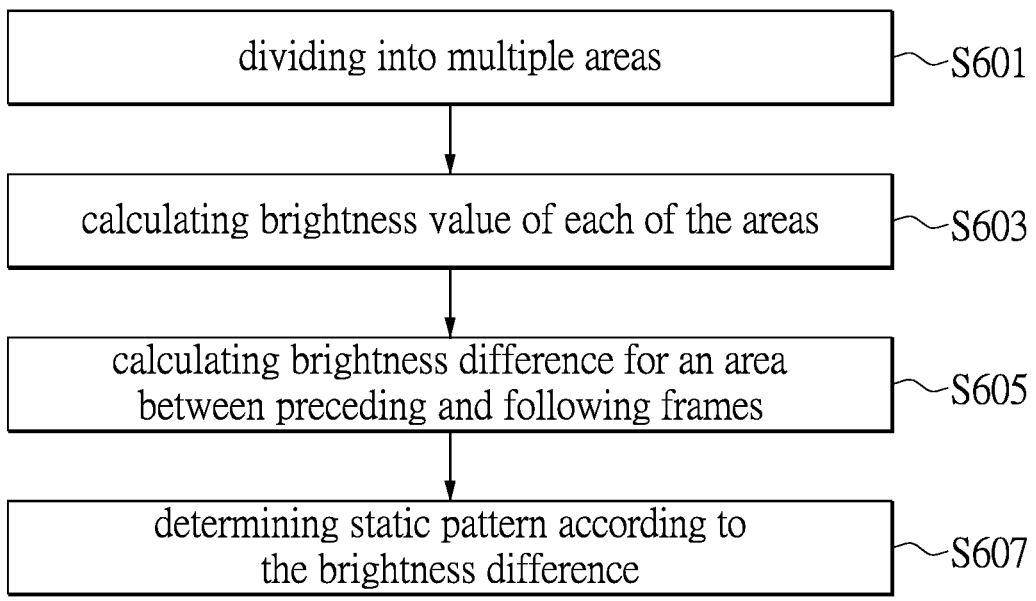
FIG. 6 is a flow chart describing a process for determining a static pattern via a brightness difference method in one embodiment of the disclosure.

One of the methods to determine whether or not the area or pixel in the frame is a static pattern is to refer to a brightness distribution of the frame. As shown in FIG. 5, in addition to calculating the static pattern index for each of the pixels of the frame when receiving a video, the more efficient way is to divide the frame into multiple areas (step S501). The brightness value for each of the areas can be calculated (step S503). For example, in a RGB color space, the brightness value for each area or pixel can be obtained from the red, green and blue channel values; in a YUV color space, in which 'Y' indicates luminance and 'U' and 'V' indicate chrominance, the 'Y' can be used as the brightness value. The brightness value of the area can be an average of the brightness values of all the pixels in the area.

After obtaining the brightness values for the multiple areas in each of the frames, a brightness distribution in the frame can be rendered and the brightness distribution can be clustered in groups. The multiple areas can be classified into a plurality of brightness groups according to the brightness values with respect to the areas. Further, the brightness relationship, i.e., a brightness consistency, of the areas between the preceding frame and the following frame can be used to determine the static pattern in the image. The time threshold can also be incorporated to conduct a determination of the static pattern. When one or more areas in the consecutive frames have a consistent brightness performance and also match the condition of the time threshold, it can be determined that the static pattern is a static pattern. It should be noted that the time threshold is configured to be a number threshold of the consecutive frames.

According to one embodiment of the disclosure, the areas in the frames can be grouped into a high brightness group and a low brightness group according to the brightness values of the areas. A brightness threshold is accordingly defined. The areas with the brightness values higher than or equal to the brightness threshold are grouped into the high brightness group, and the areas with the brightness values lower than the brightness threshold are grouped into the low brightness group. An average brightness, a maximum brightness and a minimum brightness of the high brightness group and the low brightness group are obtained respectively (step S505). In an aspect of the method of the disclosure, the average brightness, the maximum brightness and/or the minimum brightness can be used to check the consistency of the brightness of the pixels or the areas. The average brightness, the maximum brightness and/or the minimum brightness of the brightness values of the pixels or areas forms a reference to determine the static pattern (step S507) since it is acknowledged that the adjacent pixels or areas included in the static pattern should have consistent characteristics of brightness distribution.

It should be noted that the brightness clustering method can be used to determine the static pattern in a video. In the method for processing the static pattern of the disclosure, since the determination of the static pattern may still have misjudgment, the static pattern index is introduced to serve as an indication to determine the static pattern. In this way, the score of static pattern index increases when the pixel or the area is determined as part or entire of the static pattern by several methods for determining the static pattern. The score of the static pattern index can therefore be accumulated. When the accumulated score reaches a specific value, the score of the static pattern index can be used to determine the static pattern in the video.

Embodiment 2: Brightness Difference Method Between Preceding and Following Frames One further method for determining the static pattern according to a brightness difference between a preceding frame and a following frame is provided, as shown in a flow chart of FIG. 6. Since the pixel or area in a static pattern in the preceding and following frames has consistency (or smaller difference) of brightness, the brightness difference between the preceding and following frames can be a reference to determine whether or not the pixel or area is part or entire of the static pattern. The brightness difference is then compared with a brightness difference threshold, and the pixel or area with relatively small brightness difference between the frames can be determined as the static pattern initially.

In addition to processing each of the pixels in the frames, the frame can also be divided into multiple areas for calculating the static pattern index for each of the areas (step S601). The brightness value with respect to each of the areas is obtained (step S603).

The brightness differences of the brightness values of each of the areas in the consecutive frames are calculated (step S605). The brightness difference threshold is incorporated to determine whether or not the areas are part or entire of the static pattern based on the aspect that the static pattern in the consecutive frames has consistency of brightness. If the brightness difference of the area in the frames is smaller than the brightness difference threshold, the area is determined as the static pattern (step S607).

Figure 7:
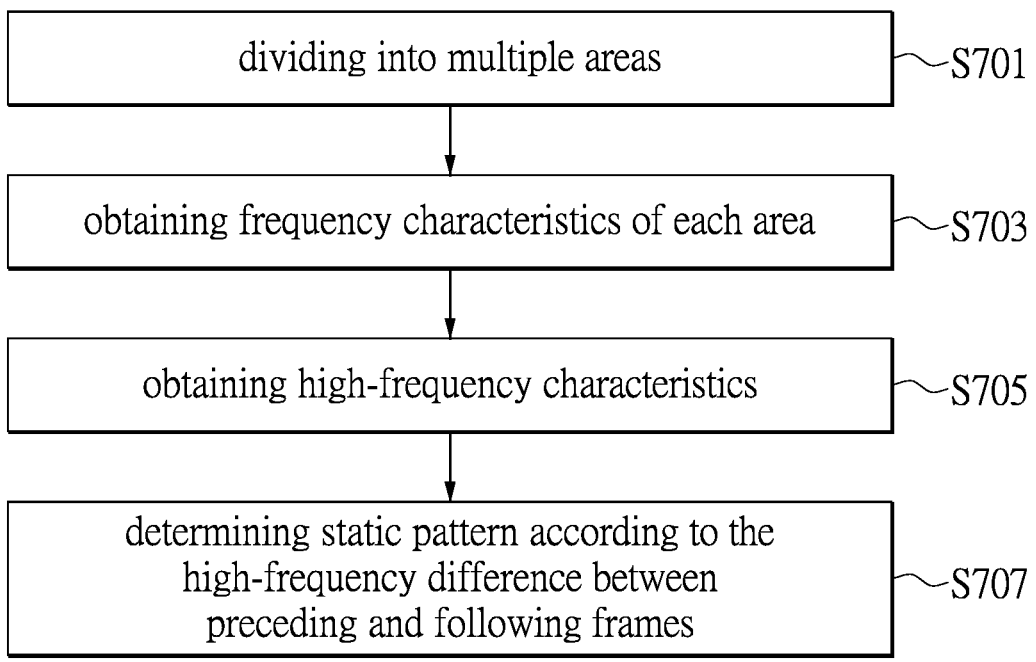
FIG. 7 is a flow chart describing a process for determining a static pattern via a high-frequency performance method in one embodiment of the disclosure.

Embodiment 3: High-Frequency Difference Method Between Preceding and Following Frames In addition to the above-mentioned brightness clustering method or brightness difference method between preceding and following frames that incorporates aspect of consistency of brightness between the neighboring areas or the frames to determine the static pattern, a frequency performance of each of the areas in the preceding and following frames in a frequency domain can also be used to determine the static pattern. Reference is made to FIG. 7, which shows a flow chart describing the process of using high frequency performance in the frames to determine the static pattern according to one embodiment of the disclosure.

In addition to obtaining frequency performance of each of pixels in the frames, the frames in a video can be divided into multiple areas for convenience of calculation (step S701). The image data of the frame image is converted to the frequency domain. In an exemplary example, the image is converted to a frequency domain via a Fourier transform method so as to obtain frequency characteristics of each of the areas (step S703).

High-frequency characteristics for each of the areas are obtained (step S705), and one feature of the static pattern is the high-frequency characteristics. It should be noted that edges of an image are parts of high frequency portion of the image. The high-frequency portion of the image generally has more changes. On the contrary, the low-frequency portion of the image has small changes. Therefore, the high-frequency characteristics can be used as a reference to determine the static pattern which has more changes on its edges.

If the area is part of the static pattern, the frequency performance of the static pattern in the preceding frame and the following frame should have consistent performance. High-frequency differences for each of the areas in the frames are calculated. The high-frequency difference is compared with a high-frequency difference threshold. If the high-frequency difference of the area is smaller than the high-frequency difference threshold, the same area in the preceding frame and the following frame is shown to have a consistent high-frequency performance, and the area can be determined as the static pattern initially (step S707).

Embodiment 4: Hole-Filling Method

Figures 8, 9:
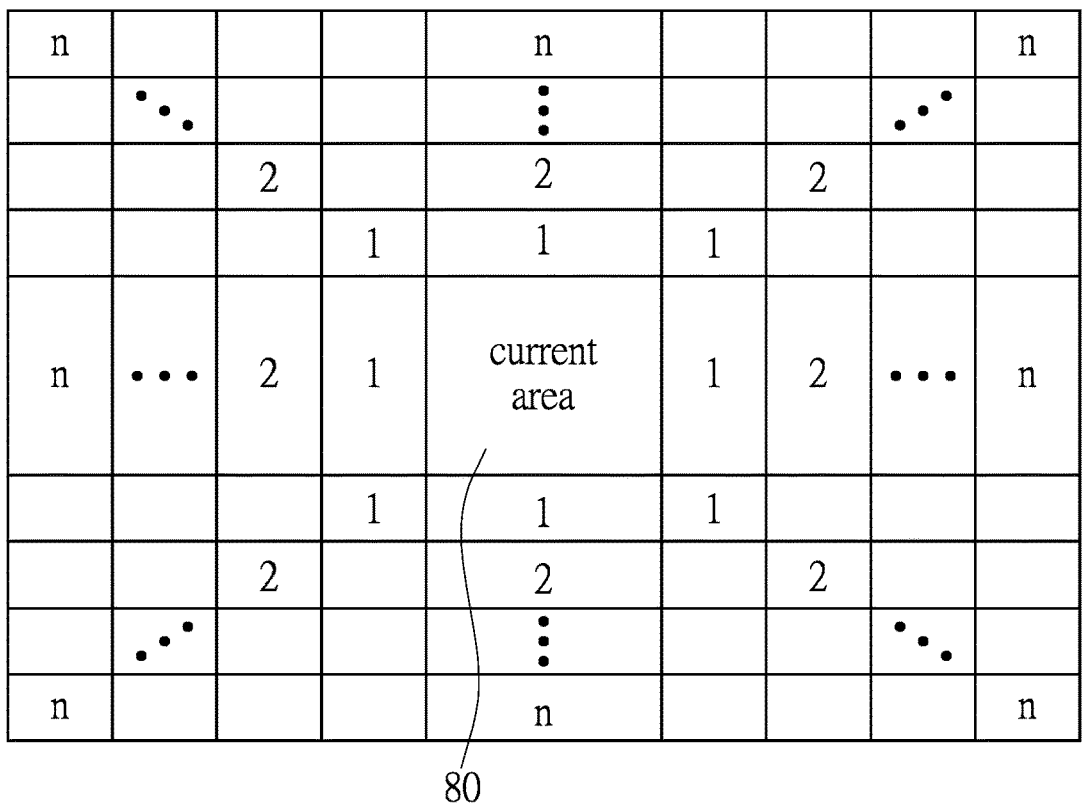
FIG. 8 is a schematic diagram depicting using neighboring image features to determine the static pattern in the image in one embodiment of the disclosure.
FIG. 9 is a flow chart describing a process for compensating the static pattern index via a compensation method for timeline information in one embodiment of the disclosure.

FIG. 8 is a schematic diagram depicting using neighboring image features to determine the static pattern according to one embodiment of the disclosure. In the diagram, while processing the areas of each of the frames, a current area 80 is provided. A hole-filling method is provided for firstly obtaining image features of the areas in various directions of the current area 80. The image features in the various directions are such as image features of an upper area, a lower area, a left area, a right area, an upper-right area, a lower-right area, and an upper-left area and a lower-left area of the current area 80. The image feature can be, for example, a high-frequency feature. A distance threshold (n) is used for determining if any high-frequency change occurs within a distance 'n' in every direction of the current area 80. The high-frequency change means there is a static boundary, and it is determined that the current area 80 includes part of the static pattern. The score of the static pattern index of the current area 80 is increased, e.g., adds 1, since the image feature of the current area 80 meets the above-mentioned scenario.

According to one of the embodiments, the above-mentioned methods for determining the static pattern are used to accumulate the score of the static pattern index as the pixel or the area is determined as a static pattern. If the score of the static pattern index accumulates higher, part or all of the areas are confirmed as the static pattern. The final static pattern index of the area or the pixel can be used to confirm the static pattern if the accumulated score reaches a specific value.

The methods for determining the static pattern described in the following embodiments are used to eliminate a problem of misjudgment.

Embodiment 1: Compensation Method for Timeline Information

FIG. 9 is a flow chart describing a process of compensating the static pattern index by a compensation method for timeline information according to one embodiment of the disclosure. The video includes a plurality of frames over time. The timeline information is referred to for determining if the static pattern index should be compensated.

In the process of compensating the static pattern index, the static pattern indexes of the areas in the plurality of frames within a period of time are obtained (step S901). The static pattern indexes are compared one-by-one with an index threshold preset by the system (step S903). The index threshold is referred to as a reference to determine if the area includes part of the static pattern. In the meantime, if an accumulated number of times as the area or pixel is determined as the static pattern is greater than a number threshold or a ratio threshold set by the system, the static pattern index of the area (or pixel) is compensated (step S905). The compensation is, for example, increasing the static pattern index of the current area or pixel in order to correct the misjudgment that may occur on one of the frames.

In an exemplary example, one of the areas in k image frames is determined as the static pattern within p image frames obtained for a period of time via any of the methods described in FIG. 5 to FIG. 8. If the number 'k' occupies a certain proportion of the number 'p' (k/p) and is also higher than the above-mentioned ratio threshold (e.g., 2/3), the static pattern index of the pixel or the area in the last frame (i.e., the number 'p' frame) is compensated.

Embodiment 2: Spatial Information Compensation Method

Figure 10:
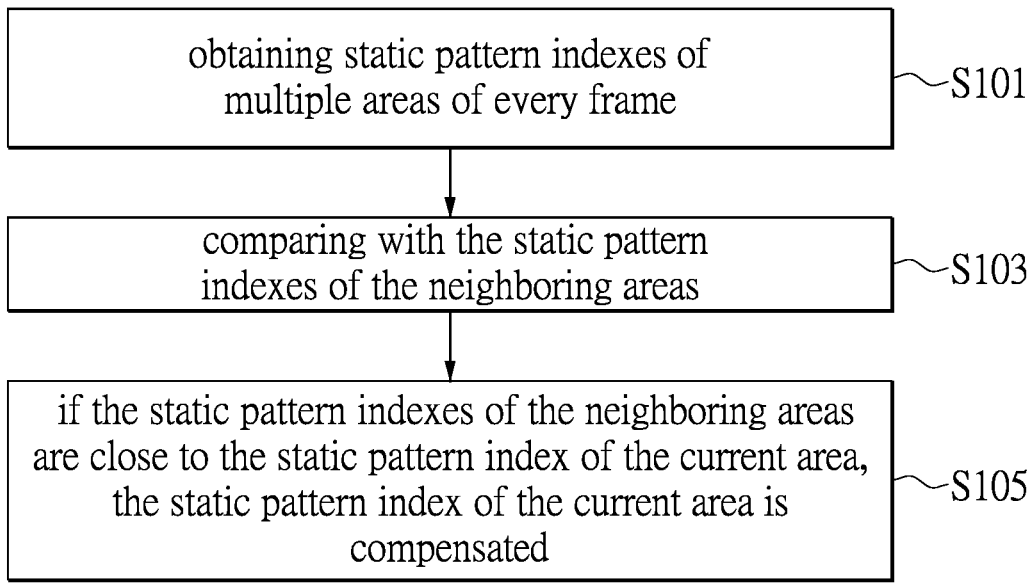
FIG. 10 is another flow chart describing a process for compensating the static pattern index via a spatial information compensation method in another embodiment of the disclosure.

FIG. 10 is a flow chart describing a process of compensating the static pattern index via a spatial information compensation method according to one embodiment of the disclosure. The compensation method is based on a comparison between the static pattern indexes of the current area or pixel and the neighboring areas or pixels. In the method, the static pattern indexes of the areas in each of the frames are firstly obtained (step S101). While processing the current area, the static pattern index of the current pixel or area is compared with the static pattern indexes of its neighboring pixels or areas (step S103). If the index approaches and reaches to an index similarity threshold, the static pattern indexes of the neighboring areas are similar. The static pattern index of the current area can be accordingly compensated (step S105).

The following embodiments describe the method for determining the static pattern index. In the method, the score of the static pattern index is reset when confirming the non-static pattern.

Embodiment 1: Brightness Difference Method Between Preceding and Following Frames Reference is made to FIG. 11, which is a flow chart that describes a process of setting the static pattern index by a brightness difference method between preceding and following frames. In this method, if the pixel or the area includes part of the static pattern, the brightness of a preceding frame and a following frame of a current frame should be similar, and the brightness difference should not be too large. Therefore, the brightness difference between the preceding and following frames can be referred to as a condition to determine if the static pattern index should be reset to zero.

In the process, a series of brightness values of each of areas or pixels of the consecutive frames are obtained (step S111). The brightness differences of the same area (or pixel)

at the preceding and following frames are calculated (step S113). The brightness difference is compared with a brightness difference threshold that can be the threshold used in the step of calculating the static pattern index in FIG. 6 (step S115). The score of the static pattern index of the current area is reset to zero if the brightness difference is greater than the brightness difference threshold (step S117).

Figure 12:
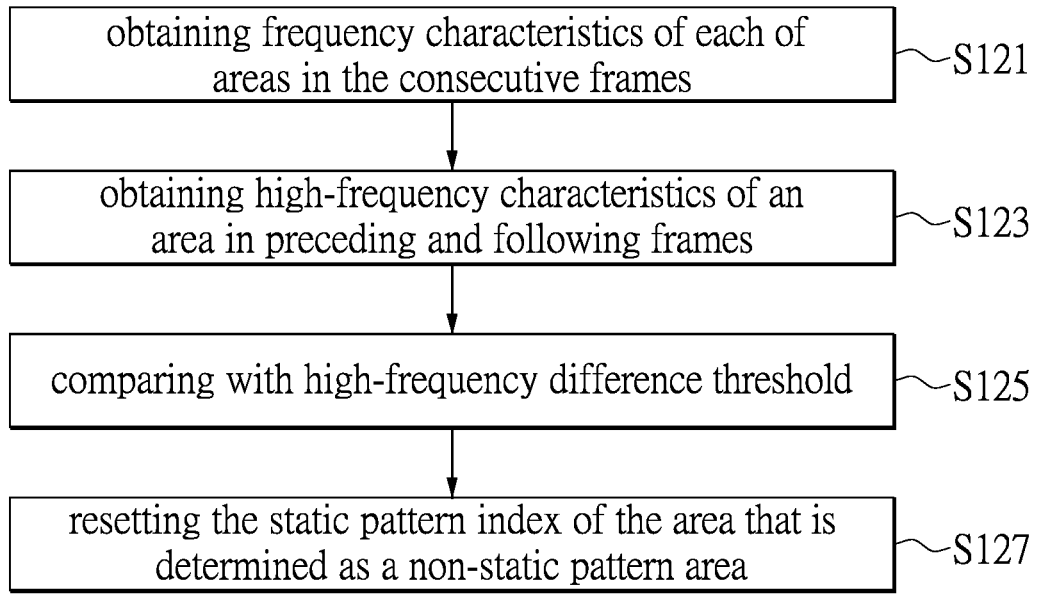
FIG. 12 is a flow chart describing a process of resetting the static pattern index via a high-frequency difference method between preceding and following frames in one embodiment of the disclosure.

Embodiment 2: High-Frequency Difference Method Between Preceding and Following Frames Similarly, the high frequency performances of the pixel or the area in the preceding and following frames can be used as one of the conditions for confirming the static pattern. Reference is made to FIG. 12, which shows a flow chart describing a high-frequency difference method between preceding and following frames for resetting static pattern index in one embodiment of the disclosure.

In the process, frequency characteristics of each of the areas in a series of consecutive frames can be obtained (step S121). Therefore, the high-frequency characteristics at the same area or pixel in the preceding and following frames can be obtained, and a high-frequency difference can be calculated (step S123). The high-frequency difference can be compared with a high-frequency difference threshold (step S125). If the high-frequency difference is greater than or equal to the high-frequency difference threshold, it is determined that the high-frequency performance of the area or the pixel between the preceding and following frames is inconsistent since the difference is too large. This means there is no static pattern. Therefore, the score of the static pattern index can be reset due to the non-static pattern area (step S127).

Embodiment 3: Method for Preventing Misjudgment Via Spatial Information

Figure 13:
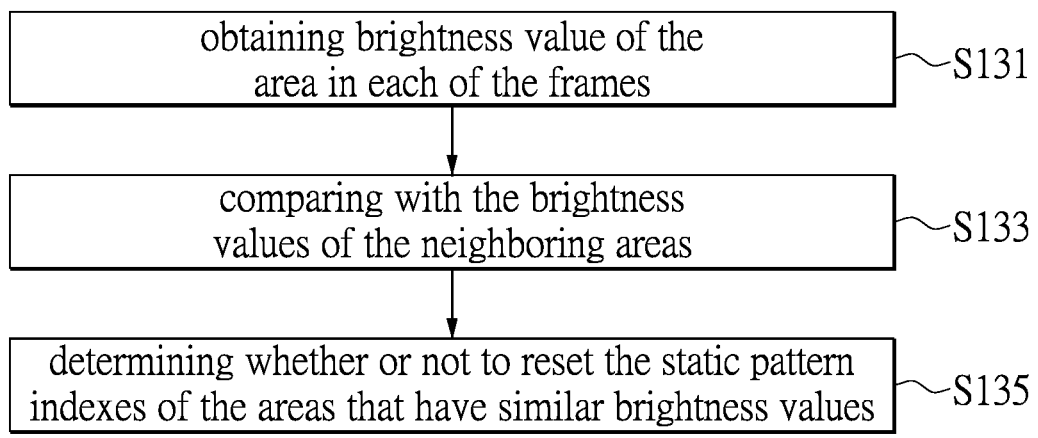
FIG. 13 is a flow chart describing a process of using spatial information to prevent resetting the static pattern index due to misjudgment in one embodiment of the disclosure.

FIG. 13 shows a flow chart describing the method for preventing misjudgment that results in resetting static pattern index via the spatial information in one embodiment of the disclosure. The method is to determine whether or not any misjudgment of the non-static pattern exists by checking the brightness relationship between the current area and its neighboring areas.

Firstly, a brightness value of each of the areas of every frame is obtained (step S131). The brightness value of a current area is then compared with the brightness values of the neighboring areas (step S133) so as to find out the areas with similar brightness values and determine if their static pattern indexes (step S135) are to be reset. If the brightness value of the current area is similar with the brightness values of most of the neighboring areas, the static pattern index of the current area that is improperly determined as the non-static pattern may not be reset. Otherwise, the score of the static pattern index is reset if the current area is correctly determined as the non-static pattern.

Embodiment 4: Method for Preventing Misjudgment by Detecting a Specific Object

Figure 14:
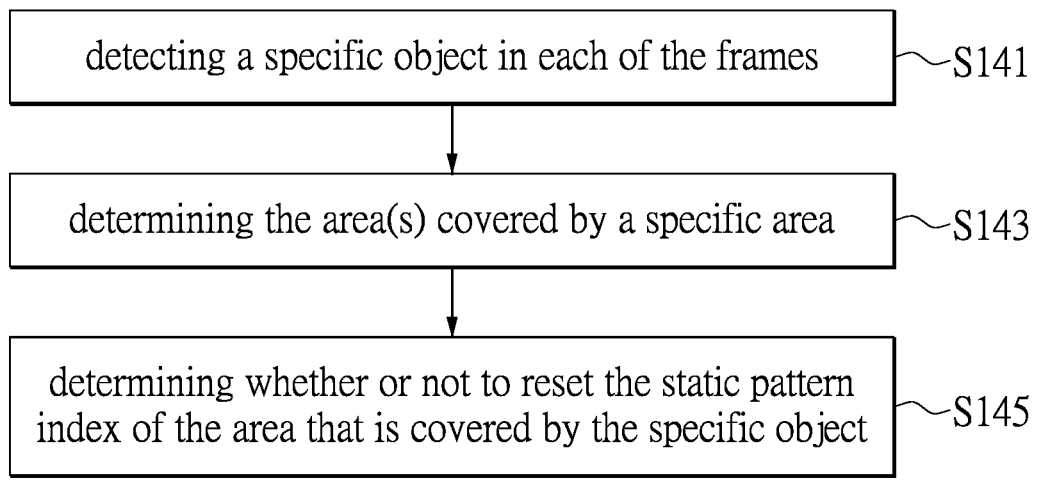
FIG. 14 is a flow chart describing a process for detecting a specific object in order to prevent resetting the static pattern index due to misjudgment in one embodiment of the disclosure.

FIG. 14 shows another flow chart, which describes a method for preventing misjudgment that may result in resetting static pattern index by detecting a specific object in one embodiment of the disclosure. If a specific object is detected in a video (step S141), the areas covered by the specific object in each of the frames can be determined (step S143). The static pattern indexes of the areas that are covered by the specific object can be reset (step S145).

If the specific object is a dynamic object in the consecutive frames, the static pattern index of the area or pixel in the frames may not be affected. However, the static pattern index of the pixels or the areas that the specific object passes through in the frames should be avoided from being reset because the pixels or the areas may be determined as the non-static pattern since the dynamic object is detected.

The following lists the characteristics of the above-mentioned object that is to be detected. If the characteristics of the pixels or the areas match with the listed characteristics, such as area, aspect ratio, shape or brightness of the object, a detection result shows that the specific object is detected so that the static pattern index of the pixel or the area covered by the specific object will not be adjusted. On the contrary, if the characteristics of the pixels or the areas do not match with the listed characteristics, there is not any specific object to be detected, and the calculation of the static pattern index will not be affected.

First Object Feature: Area

An area of a known object can be used as a condition to determine whether or not an object passes through the current pixel or area. If the known object passes through the current pixel or area, the brightness of the pixel or area in the preceding frame and the following frame will change. An area of the areas where the brightness values change is close to the area of the known object.

Second Object Feature: Aspect Ratio

An aspect ratio of the known object is used as a condition for determining if the object passes through the current pixel or area. In other words, if the object passes through the current pixel or area, the aspect ratio of the area with brightness change between a preceding frame and a following frame should be similar with the aspect ratio of the given object.

Third Object Feature: Shape

A shape of the known object can be referred to as a condition for determining if any object passes through the current pixel or area. If any object is found passing through a location of the current pixel or area, locations of regions that undergo changes of brightness in the preceding and following frames should be consecutive.

Fourth Object Feature: Brightness

A brightness of the known object can be referred to as a condition for determining if any object passes though the current pixel or area. If any object is found passing through the location of the current pixel or area, the brightness of the current pixel or area at the preceding and following frames should be close to the brightness of the object.

In conclusion, according to the method and the circuit system described in the above embodiments of the disclosure, several methods used to obtain the static pattern are used to calculate a static pattern index for each of the areas of a frame. The static pattern index is used as a reference for determining the static pattern in each of the frames. In addition, the index threshold and the time threshold are used to determine the areas having the static pattern and are also referred to for adjusting the image data. Thus, the impact on the display panel due to the static pattern can be effectively prevented. In an application, the circuit system implementing the method can be applied to a control circuit of a specific display panel, e.g., an OLED panel. When the control circuit confirms the static pattern in the video, the method can be adapted to adjust the brightness for preventing the burn marks when the panel displays the same picture for a long period of time. Algorithms provided in the method is to determine the areas having the static pattern for a long time, and adjust the image data thereof.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for processing a static pattern in an image that is adapted to a circuit system, wherein the method comprises:
    calculating a static pattern index for each pixel of every frame of a video or every divided area of the video, wherein the static pattern index indicates a score of every pixel or every area of every frame that is determined as a static pattern;
    determining the pixel or the area having the static pattern of every frame by an index threshold, and determining the pixel or the area having the static pattern of the video by a time threshold;
    calculating a weight for adjusting a brightness value of the pixel or the area having the static pattern by referring to a non-static-pattern brightness curve and a static pattern brightness curve with respect to a current frame according to the static pattern index of the pixel or the area that is determined as the static pattern; and
    adjusting the brightness value of the pixel or the area that is determined as the static pattern with the weight.

2. The method according to claim 1, wherein the time threshold is flexibly adjusted according to a frame rate of a display panel that uses the circuit system.

3. The method according to claim 2, wherein the time threshold indicates a number of consecutive frames of the video.

4. The method according to claim 1, wherein the pixel or the area that is determined not to be a static pattern retains its original brightness value.

5. The method according to claim 1, wherein, when calculating the static pattern index of the pixel or the area, a plurality of methods for determining the static pattern are used to calculate the static pattern index; when any of the plurality of methods is used to determine the static pattern, the scores of the static pattern indexes are accumulated; a result of misjudgment is corrected according to features of the pixel or the area in both a preceding frame and a following frame or the neighboring pixels or areas; the score is decreased if the pixel or the area is misjudged as the static pattern, and the score is increased if the pixel or the area is misjudged as the non-static pattern; and the static pattern index of the pixel or the area is reset to zero or an original value when the pixel or the area is determined as the non-static pattern.

6. The method according to claim 5, wherein, a brightness clustering method, which is one of the methods for determining the static pattern, is used to determine whether or not the pixel or the area is the static pattern according to consistency among an average brightness, a maximum brightness and a minimum brightness of a high brightness group and a low brightness group of neighboring pixels or areas in the frame.

7. The method according to claim 5, wherein, a brightness difference method between preceding and following frames is used to determine the static pattern based on whether or not a brightness difference of each pixel or area between one or more preceding frames and one or more following frames is smaller than a brightness difference.

8. The method according to claim 7, wherein, if the brightness difference of the pixel or the area between the preceding frame and the following frame is smaller than the brightness difference threshold, the score of the static pattern index of the pixel or the area is reset.

9. The method according to claim 5, wherein, a high-frequency difference method between preceding and following frames is used to determine the static pattern based on whether or not high-frequency performances of the pixel or the area in one or more preceding frames and in one or more following frames are consistent.

10. The method according to claim 9, wherein, if the high-frequency performances of the pixel or the area in the preceding and following frames are determined to be inconsistent based on a high-frequency difference threshold, the score of the static pattern index of the pixel or the area is reset.

11. The method according to claim 5, wherein, a hole-filling method is used to determine the static pattern based on whether or not there is a static boundary within a distance at every neighboring direction of the pixel or the area.

12. The method according to claim 5, wherein, a compensation method for timeline information is used to correct misjudgment of the static pattern, in which the static pattern index is increased when a number of times that the pixel or the area is determined as the static pattern within a period of time is higher than a ratio threshold.

13. The method according to claim 5, wherein, a spatial information compensation method is used to correct misjudgment of the static pattern, in which the static pattern index of the pixel or the area is compensated if the static pattern indexes of the neighboring pixels or areas are similar.

14. The method according to claim 5, wherein whether or not the pixel or the area is improperly misjudged as the non-static pattern is determined based on the brightness values of the neighboring pixels or areas.

15. The method according to claim 5, wherein, in the method for processing static pattern of the video, the static pattern index of the pixel or the area covered by a moving object is not reset if the moving object is detected in the consecutive frames.

16. A circuit system, comprising:
    an image processing circuit, performing a method for processing static pattern in an image,
        including:
        receiving a video;
        calculating a static pattern index for each pixel of every frame of a video or every divided area of the video, wherein the static pattern index indicates a score of every pixel or every area that is determined as a static pattern;

determining the pixel or the area having the static pattern of every frame by an index threshold, and determining the pixel or the area having the static pattern of the video by a time threshold;

calculating a weight for adjusting a brightness value of the pixel or the area having the static pattern by referring to a non-static-pattern brightness curve and a static pattern brightness curve with respect to a current frame according to the static pattern index of the pixel or the area that is determined as the static pattern; and adjusting the brightness value of the pixel or the area that is determined as the static pattern with the weight; and receiving, by a display control circuit, the brightness value processed by the image processing circuit so as to output the brightness value to a driving circuit of a display, and displaying the image by the display.

17. The circuit system according to claim 16, wherein, in the method for processing the static pattern of the image, the time threshold is flexibly adjusted according to characteristics of a display panel that uses the circuit system.

18. The circuit system according to claim 16, wherein, in the method for processing the static pattern, when calculating the static pattern index of the pixel or the area, a plurality of methods for determining the static pattern are used to calculate the static pattern index; when any of the plurality of methods is used to determine the static pattern, the scores of the static pattern indexes are accumulated; a result of misjudgment is corrected according to features of the pixel or the area in both a preceding frame and a following frame or the neighboring pixels or areas; the score is decreased if the pixel or the area is misjudged as the static pattern, and the score is increased if the pixel or the area is misjudged as the non-static pattern; and the static pattern index of the pixel or the area is reset when the pixel or the area is determined as the non-static pattern.

* * * * *